Oct. 21, 1958         D. W. DANIEL         2,856,637

METHOD OF MAKING A GEAR FINISHING TOOL

Filed April 30, 1956

*INVENTOR.*
DAVID W. DANIEL

BY

ATTORNEYS

United States Patent Office 2,856,637
Patented Oct. 21, 1958

2,856,637
METHOD OF MAKING A GEAR FINISHING TOOL

David W. Daniel, Detroit, Mich., assignor to National Broach & Machine Company, Detroit, Mich., a corporation of Michigan Application April 30, 1956, Serial No. 581,675

9 Claims. (Cl. 18—47.5)

The present invention relates to a method of making a gear finishing tool, and more particularly, a method useful for the production of a tool in the form of one of the members of a set of bevel, spiral bevel, or hypoid gears.

It is an object of the present invention to provide a method of making a gear finishing tool which comprises producing a plastic model of one of the members of a set of conjugate gears, making a model of the other member of the set having at least the surface portion of its teeth formed of hard, resilient plastic having abrasive grains or particles embedded therein, meshing said members, rolling said members together, preferably by driving one of said members first in one direction and then in the other, and opposing rotation of the driven member by suitable means, such for example as brake means, to remove material from the teeth of the plastic model by the action of the abrasive grains or particles, making a mold from said plastic model, and molding a tool in said mold having teeth at least the surface portions of which are formed of hard, resilient plastic having abrasive grains or particles permanently embedded therein.

Other objects and features of the invention will become apparent as the description proceeds, especially when taken in conjunction with the accompanying drawings, wherein.

Figure 1:
Figure 1 is a diagrammatic elevational view of a non-cylindrical pinion.

The present invention is applicable to the production of a gear finishing tool in the form of any gear adapted to be used by running in mesh with a generally conjugate work gear. However, it is particularly useful in producing a gear finishing tool adapted to finish a gear having crowned teeth. Crowned teeth are defined as teeth modified from theoretical form by the removal of material from adjacent the ends and in some cases from adjacent the tops and bottoms thereof, to prevent end contact and to produce gear sets which run more quietly and which are adapted to transmit greater loads without failure. The present invention is particularly useful in the finishing of gears or pinions selected from bevel, spiral bevel, or hypoid gear sets.

Gears of this type are extremely sensitive and it is still common practice to select matched sets by trial and error. When gears and pinions of this type are finished by tools as disclosed herein, gears and pinions may be produced which are interchangeable, at least to a much greater degree than has heretofore been possible.

In accordance with the present invention a master gear and pinion are provided. A tool to finish the gear is generally in the form of a pinion and a tool to finish the pinion is generally in the form of a gear. For the present purpose it is assumed that the description is applied to the production of a tool for finishing a pinion. The first step is to produce a plastic model of the gear. This is accomplished by forming a plastic mold of the master gear, treating the surface of the mold with a parting material such for example as wax, and molding therein a plastic model of the gear.

The plastic model of the gear may be formed in its entirety of plastic material, or it may be provided with a core of suitable material such for example as metal. The essential requirement is that sufficient plastic material be provided at the tooth surfaces to permit substantial removal of material therefrom, as will subsequently be described.

By similar procedure, a model of the pinion is produced, at least the surface portions of the teeth of which consist of a hard plastic material having abrasive grains or particles firmly and permanently embedded therein. This plastic abrasive tool is produced by forming a mold of the master pinion and using the mold to mold the plastic abrasive tool.

Thereafter, the plastic model of the gear and the model of the pinion are placed in mesh and driven in rotation. This is accomplished preferably by driving one of the members, as for example the plastic pinion, and driving the other member of the set solely through their meshed engagement. Preferably, rotation is accomplished first in one direction and then in another to provide uniform action at opposite sides of the teeth. Also, the operation is preferably carried out by opposing rotation of the driven member, such for example as by brake action.

The rubbing together of the teeth of the model gear and pinion results in removal of material from the teeth of the plastic model of the gear by the action of the abrasive grains or particles. The operation is continued until the teeth of the plastic gear are machined to be substantially perfectly conjugate to the teeth of the pinion.

It is common practice to produce gears or pinions of bevel, spiral bevel or hypoid type by a machining operation which produces crowned teeth. If the master pinion of which the plastic abrasive tool is a duplicate has crowned teeth, it will be apparent that initial contact between the teeth of the plastic pinion and plastic gear will initially be limited to a zone centrally of the teeth and that as a result of the crowned shape of these teeth, end contact will be avoided. However, as the plastic gear and plastic abrasive tool are rotated in mesh, the material removed from the teeth of the plastic gear causes the teeth of this member to become longitudinally concave and capable of contacting the teeth of the abrasive pinion from end to end thereof.

After the two members have been rotated in mesh, preferably in both directions, and preferably under brake action, until the teeth of the plastic model of the gear have become sufficiently concave longitudinally as to conform to and contact the teeth of the abrasive pinion from end to end, the modified plastic model gear is used as a master to form a mold. This may be accomplished by forming plastic material around the modified plastic model gear, causing it to set, and separating it from the gear. Thereafter, the mold is used to mold a gear finishing tool at least the surface portions of which are formed of hard resilient plastic material having abrasive grains or particles permanently embedded therein.

This gear finishing tool is a counterpart of the modified plastic model gear and accordingly its teeth are longitudinally concave by an amount sufficient to cause the teeth to engage substantially uniformly from end to end with the crowned teeth of a metal pinion and accordingly, to finish the teeth of the metal pinion from end to end.

The final gear finishing tool may be formed in its entirety of the hard resilient plastic material but ordinarily it will be formed by employing a metal core in the form of a disc and only the tooth portions will be formed of the plastic material. In some cases the metal disc may have short teeth thereon which will extend partly into the plastic teeth in the completed tool.

It is essential to provide at least the tooth portions of the gear finishing tool of a hard resilient plastic material. The hardness of the material must be sufficient to oppose substantial resistance to deformation so that high points and irregularities on the teeth of the metal pinions finished thereby will be subjected to a strong finishing action. At the same time, the material must be sufficiently yieldable to prevent crumbling or fracture of particles of material when subjected to severely localized loading or compression, as will occur when surface irregularities of a master pinion move over the tooth surface of the tool. Finally, the plastic material must have a resilience which permits a displaced surface portion thereof to return to its initial position when released so as to ultimately produce an accurately machined surface on the metal pinion.

The grit size of the abrasive grains or particles may be varied in accordance with the material of the metal pinion, whether the operation is intended to remove substantial material or simply to remove surface imperfections and the like.

Excellent results have been obtained when the plastic material employed in the gear finishing tool is an epoxy cast resin identified as Marblette Epoxy Casting Resin #612 which has the following physical properties: Mold shrinkage .0007" per inch; density 110 lbs./ft.$^3$; tensile strength 8,000 pounds per square inch; compressive strength 19,000 pounds per square inch; flexural strength 10,000 pounds per square inch; hardness Rockwell M100; resistance to heat 200 degrees Fahrenheit; impact strength (Izod) 0.5 ft.-lbs./in. notch.

It will be understood that the foregoing properties relate to epoxy casting resin having abrasion resistance as a result of abrasive filler. The addition of the abrasive grains as taught herein, together with the addition of reinforcing material such for example as glass or asbestos fibers, or the like, may vary the physical properties.

Excellent results have been obtained when employing 60 grit Carborundum.

The initial molds of the master gears from which the plastic models are first obtained, the plastic models themselves, one of which contains the abrasive particles, and the mold obtained from the modified plastic model gear which is used to produce the final gear finishing tool, may all be made from the same or similar epoxy resins. However, it is preferable to employ a material having a somewhat higher heat resistance to produce the molds since this permits the application of heat to the epoxy resin in casting or molding the plastic members. Accordingly, the molds may conveniently be formed of phenolic resins, such as phenol-formaldehyde and phenol-furfural compounds having a relatively high resistance to heat. For the same reason polychloro-trifluoro-ethylene is also suitable for making the molds.

While the foregoing description is believed clearly understandable, reference is now made to the drawings. In the ensuing description there will be described the method of producing a gear finishing tool for the purpose of finishing a series of work pinions. The illustrated gears and pinions are of bevel form and it is to be understood that they may be of either cylindrical or non-cylindrical form such as bevel, spiral bevel, hypoid, or the like. It will further be understood that by reversing the showing of pinions and gears, the same method may be employed for the production of a pinion-like tool for finishing a series of work gears.

The operation starts with a master pinion 10 which may have a desirable modification thereon such for example as longitudinally crowned teeth.

Very briefly described, the operation comprises making an abrasive plastic model of the pinion and a plastic model of a gear generally conjugate to the pinion. The plastic model pinion is formed of a hard resilient plastic material having abrasive particles embedded therein. The other model is formed of plastic material without the abrasive particles and therefore constitutes an abradable material. It may also be mentioned that the operation, as will subsequently be described, involves the step of removing some material from the abradable model gear and therefore it may be desirable, as is obvious, to produce an abradable model having a slight surplus of stock for subsequent removal.

In the figures, Figure 1 illustrates a master pinion 10 which may have a modification such as crowning imparted thereto.

Figure 2:
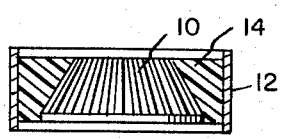
Figure 2 is a sectional view illustrating the step of producing a plastic mold of the master pinion.

In Figure 2 this master pinion is shown in a receptacle 12 into which has been poured plastic material to produce the plastic mold 14 of the master pinion.

Figure 3:
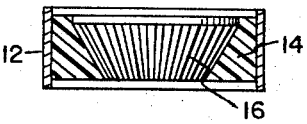
Figure 3 is a sectional view illustrating the method of making a plastic model of the master pinion.
Figure 4:
Figure 4 is an elevational diagrammatic view of the plastic model produced from the master pinion.

In Figure 3 the mold 14 is shown as reversed in the container 12 and containing the abrasive plastic model 16 of the master pinion. The model 16 appears separately in Figure 4.

By an exactly similar sequence of steps, there may be produced a plastic model of a gear generally conjugate or substantially conjugate to the plastic model of the master pinion. In the illustrated sequence of steps the desire is to produce a gear finishing tool in the form of a gear adapted to perform finishing operations on a series of work pinions. In this case the plastic material employed in producing the plastic model of the master pinion will have incorporated therein abrasive particles such for example as silicone carbide or the like. Since the plastic model of the gear is intended to be abraded by the abrasive plastic model of the master pinion, it will not contain abrasive particles and it may if desired be slightly oversize.

Figure 5:
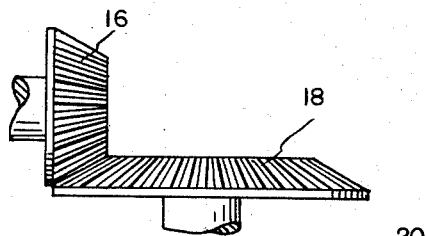
Figure 5 is an elevational view illustrating the modification of a plastic model by running it in mesh with an abrasive impregnated substantially conjugate plastic tool.

In Figure 5 there is illustrated the next step of the operation in which the abrasive plastic model of the master pinion is run in mesh with the plastic model of the gear. In this operation the gear and pinion models may be maintained under direct pressure, or rotation of the driven one of the two members may be opposed. In any case the operation is continued until by abrasion the plastic model of the gear has become truly conjugate to the abrasive plastic model of the master pinion. This will take place by removal of material substantially entirely from the plastic model of the gear and the abrasive plastic model of the master pinion will remain for all practical purposes a duplicate of the original steel master pinion. Accordingly, the abrasive plastic model of the master pinion may be used to produce a large number of modified plastic models 18 of the gear.

If the teeth of the plastic model gear were not initially provided with the reverse of the modification provided on the teeth of the steel master pinion, the abrading action of the abrasive plastic model of the master pinion will remove the material necessary to bring about substantially true conjugacy between the teeth of the plastic gear and the teeth of the abrasive plastic model of the master pinion, which remains a duplicate of the steel master pinion.

Figure 6:
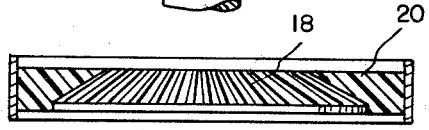
Figure 6 is a sectional view illustrating the production of a plastic mold of the modified plastic master gear.

In Figure 6 there is illustrated the use of the modified plastic model gear 18 for the production of a plastic mold 20.

Figure 7:
Figure 7 is a sectional view illustrating the production of an abrasive plastic model of the modified plastic master gear, this constituting the finishing tool.

In Figure 7 there is illustrated the use of the plastic model 20 of the modified plastic gear in the production of an abrasive plastic model of the modified plastic gear.

Figure 8:
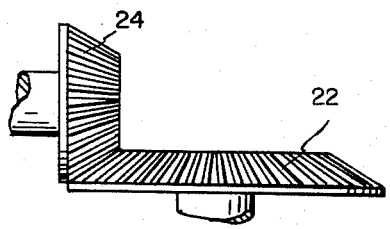
Figure 8 is a diagrammatic elevational view illustrating the manner of finishing a work pinion with the tool.

This member constitutes the tool 22 which as illustrated in Figure 8, may then be used to run in mesh with a series of work pinions 24 and will remove material from the pinions 24 to make them substantial duplicates of the master pinion 10 including whatever modifications may have been imparted to the master pinion.

Briefly reviewing the foregoing, it will be seen that the herein described method comprises first producing an abrasive plastic model identical with a steel master, using the abrasive plastic model to modify a plastic model of a generally conjugate plastic gear to make the plastic model of the gear truly conjugate to the abrasive plastic model of the master. Thereafter, the modified plastic model gear is used to form a mold to cast abrasive plastic gears which in turn may be used as tools to remove material from a series of work pieces to cause them to conform substantially identically to the original master.

In more general terms, the present invention permits the production of a gear finishing tool which is conjugate to a gear member modified from a theoretical form. This is accomplished by making an abrasive duplicate of the modified gear, rolling it in mesh with a plastic model to cause the model to conform or become conjugate to the plastic abrasive model, and finally, employing the plastic model as altered by its engagement with the plastic abrasive model, as a model for producing a mold which in turn is used to produce abrasive gear finishing tools identical with the altered plastic model.

It may be mentioned that when employing epoxy resin as the plastic material, it has been possible to obtain reproductions of gears and/or plastic models thereof which are accurate to an extremely high degree. It may also be mentioned that the use of the hard resilient plastic material as the medium for carrying the abrasive grains or particles permits the finishing of a surprisingly large number of steel gears from a single gear finishing tool.

The drawings and the foregoing specification constitute a description of the improved method of making a gear finishing tool in such full, clear, concise and exact terms as to enable any person skilled in the art to practice the invention, the scope of which is indicated by the appended claims.

What I claim as my invention is:

1. The method of making a gear finishing tool which comprises forming a plastic model of a gear, forming a model of a conjugate gear having its tooth portions formed of a hard resilient plastic material having abrasive particles embedded therein, rolling said models together in mesh to remove material from the plastic model as a result of the action of the abrasive particles, forming a mold from the plastic model, and molding a tool in said mold having teeth at least the surface portions of which are hard resilent plastic material having abrasive particles embedded therein.

2. The method of making a gear finishing tool which comprises forming a plastic model of a gear, forming a model of a conjugate gear having its tooth portions formed of a hard resilient plastic material having abrasive particles embedded therein, meshing said models, driving one of said models in rotation, and driving the other solely through their meshed engagement to remove material from the plastic model as a result of the action of the abrasive particles, forming a mold from the plastic model, and molding a tool in said mold having teeth at least the surface portions of which are hard resilient plastic material having abrasive particles embedded therein.

3. The method of making a gear finishing tool which comprises forming a plastic model of a gear, forming a model of a conjugate gear having its tooth portions formed of a hard resilient plastic material having abrasive particles embedded therein, meshing said models, driving one of said models in rotation, and driving the other solely through their meshed engagement while maintaining pressure between their teeth to remove material from the plastic model as a result of the action of the abrasive particles, forming a mold from the plastic model, and molding a tool in said mold having teeth at least the surface portions of which are hard resilient plastic material having abrasive particles embedded therein.

4. The method of making a gear finishing tool which comprises forming a plastic model of a gear, forming a model of a conjugate gear having its tooth portions formed of a hard resilient plastic material having abrasive particles embedded therein, meshing said models, driving one of said models in rotation in both directions, and driving the other solely through their meshed engagement while maintaining pressure between their teeth to remove material from the plastic model as a result of the action of the abrasive particles, forming a mold from the plastic model, and molding a tool in said mold having teeth at least the surface portions of which are hard resilient plastic material having abrasive particles embedded therein.

5. The method of making a gear finishing tool for bevel or hypoid sets which comprises forming a plastic model of one member of such set, forming a model of the other member having teeth at least the surface portions of which are hard resilient plastic having abrasive particles embedded therein, meshing said models, rotating said models together in mesh to remove material from the plastic model by the action of said abrasive particles, forming a mold from the plastic model, and molding a tool in said mold having teeth at least the surface portions of which are hard resilient plastic material having abrasive particles embedded therein.

6. The method of making a gear finishing tool for bevel or hypoid sets which comprises forming a plastic model of one member of such set, forming a model of the other member having teeth at least the surface portions of which are hard resilient plastic having abrasive particles embedded therein, meshing said models, driving one of said members in rotation and driving the other member solely through their meshed engagement to remove material from the plastic model by the action of said abrasive particles, forming a mold from the plastic model, and molding a tool in said mold having teeth at least the surface portions of which are hard resilient plastic material having abrasive particles embedded therein.

7. The method of making a gear finishing tool for bevel or hypoid sets which comprises forming a plastic model of one member of such set, forming a model of the other member having teeth at least the surface portions of which are hard resilient plastic having abrasive particles embedded therein, meshing said models, driving one of said members in rotation and driving the other member solely through their meshed engagement while maintaining pressure between their teeth to remove material from the plastic model by the action of said abrasive particles, forming a mold from the plastic model, and molding a tool in said mold having teeth at least the surface portions of which are hard resilient plastic material having abrasive particles embedded therein.

8. The method of making a gear finishing tool for bevel or hypoid sets which comprises forming a plastic model of one member of such set, forming a model of the other member having teeth at least the surface portions of which are hard resilient plastic having abrasive particles embedded therein, meshing said models, driving one of said members in rotation in both directions and driving the other member solely through their meshed engagement to remove material from the plastic model by the action of said abrasive particles, forming a mold from the plastic model, and molding a tool in said mold having teeth at least the surface portions of which are hard resilient plastic material having abrasive particles embedded therein.

9. The method of making a tool for finishing one of the members of a set of bevel or hypoid gears which comprises making a model of one of said members having at least the tooth surface portions thereof formed of a hard resilient plastic material having abrasive particles firmly embedded therein, rolling said model in mesh with a gear of abradable material and generally conjugate to the said one gear member to alter it by removing material therefrom by the action of said particles, making a mold of said altered gear and making a tool in said mold having at least its tooth surface portions formed of a hard resilient plastic material having abrasive particles therein.

References Cited in the file of this patent

UNITED STATES PATENTS

| 2,309,704 | McLaren | Feb. 2, 1943 |
| 2,351,842 | Seibold | June 20, 1944 |